United States Patent [19]

McDaniel

[11] Patent Number: 4,472,519
[45] Date of Patent: Sep. 18, 1984

[54] POLYMERIZATION CATALYST SYSTEM

[75] Inventor: Max P. McDaniel, Bartlesville, Okla.

[73] Assignee: Phillips Petroleum Company, Bartlesville, Okla.

[21] Appl. No.: 412,347

[22] Filed: Aug. 27, 1982

[51] Int. Cl.$^3$ ................................................ C08F 4/64
[52] U.S. Cl. .................................... 502/103; 502/125; 502/134; 260/448 A; 526/125; 526/127
[58] Field of Search ...................... 252/429 A, 429 C; 260/448 A; 502/125, 134, 103

[56] References Cited

U.S. PATENT DOCUMENTS

| | | | |
|---|---|---|---|
| 3,468,817 | 9/1969 | Hsieh | 252/429 A X |
| 3,657,159 | 4/1972 | Vandenberg | 260/448 A X |
| 3,661,878 | 5/1972 | Aishima et al. | 252/429 B X |
| 3,787,323 | 1/1974 | Aishima et al. | 252/429 B X |
| 3,969,332 | 7/1976 | Gloriod et al. | 252/429 A X |
| 3,991,259 | 11/1976 | Piekarski et al. | 252/429 A X |
| 4,036,867 | 7/1977 | Piekarski et al. | 260/448 A |
| 4,107,414 | 8/1978 | Giannini et al. | 252/429 C X |
| 4,146,549 | 3/1979 | Aishima et al. | 260/448 A |

*Primary Examiner*—Patrick Garvin

[57] ABSTRACT

Novel silicon-aluminum compounds having at least two aryl-silicon bonds useful as cocatalysts for a catalyst system for polymerizing olefins.

15 Claims, No Drawings

POLYMERIZATION CATALYST SYSTEM

The present invention relates to a catalyst system useful for the polymerization of olefins. In another aspect, the present invention relates to novel compounds containing silicon and aluminum.

It is well known in the art that olefins can be polymerized using a catalyst comprising a compound of metals of Groups IVb, Vb, and VIb of the Periodic Table and a cocatalyst such as an organoaluminum halide.

U.S. Pat. No. 3,661,878 introduced a new type of compound that could be used as a cocatalyst in such catalyst systems. The patent indicates that the compounds have the formula RRHSiOAlRR wherein the R groups are individually selected from such alkyl, aryl, and cycloalkyl radicals. The patent further indicates that the siliconhydrogen bond of such compounds is an indispensable structural factor.

U.S. Pat. No. 3,787,323 disclosed yet another similar compound as being suitable as a cocatalyst for olefin polymerization. The cocatalyst compound of that patent has the formula RRHSiOAlXX wherein each R is an alkyl group and each X is a halide group.

U.S. Pat. No. 3,969,332 disclosed yet another type of silicon-aluminum compound as being useful as a cocatalyst. The compounds are stated as being those having the formulas RRRSiOAlRR or

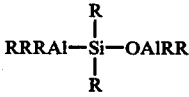

wherein all the R's are saturated hydrocarbon radicals.

An object of the present invention is to provide still another type of silicon-aluminum compound that is suitable for use in a catalyst system for the polymerization of olefins.

Still another object is to provide a process for polymerizing olefins using such silicon-aluminum compounds.

Yet another object is to provide new silicon-aluminum compounds.

BRIEF SUMMARY OF THE INVENTION

In accordance with the present invention there is provided a catalyst system for the polymerizaton of olefins comprising (1) an olefin polymerization catalyst comprising a compound containing a metal of Groups IVb, Vb, and VIb of the Periodic Table and (2) a cocatalyst comprising at least one compound of the formula

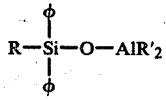

wherein each $\phi$ is an aryl radical, R is an aryl, alkyl, cycloalkyl, aralkyl, alkaryl radical, or —O—AlR'$_2$, and wherein each R' is individually selected from hydrogen, halides, alkyl, aryl, alkoxy, and aryloxy radicals, with the further requirements that if one of the R' radicals attached to an Al atom is a halide, the other must be a radical other than hydrogen and that only one of the R' radicals attached to each Al atom can be hydrogen.

DETAILED DESCRIPTION OF THE INVENTION

The compounds of metals of Groups IVb, Vb, and VIb that are suitable as catalysts for the polymerization of olefins are well known in the art. An especially preferred group include the halides, haloalkoxides and alkoxides of those metals and in particular the derivatives of titanium and vanadium. Typical examples of such compounds include TiCl$_4$, Ti(OC$_2$H$_5$)$_4$, Ti(OC$_2$H$_5$)$_3$Cl, VOCl$_3$, VCl$_5$ and VO(OC$_2$H$_9$)$_3$. As is known in the art, the transition metal catalyst is often used in conjunction with a support, such as a halide of magnesium, manganese, calcium, cadmium, zinc, or iron.

The silicon-aluminum cocatalysts of the present invention can be prepared by reacting an aluminum compound of the formula AlR'$_3$ wherein R' is as described above with a silanol or a silane diol. The presently preferred aluminum compounds are those in which each R' is an alkyl radical having 1 to 4 carbon atoms. Typical aluminum compounds include trimethylaluminum, triethylaluminum, tri-n-butylaluminum, diethylaluminum hydride, di-n-propylaluminum hydride, and diethylaluminum chloride, and diisobutylaluminum hydride.

The silicon compound reactants have the formula

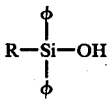

wherein each $\phi$ is an aryl radical and R is an aryl, alkyl, cycloalkyl, aralkyl, alkaryl, or hydroxy radical. The R radicals preferably have 1 to 10 carbon atoms. Typical examples of such compounds include methyl diphenylsilanol, triphenylsilanol, tri(1-naphthyl)silanol, diphenylsilane diol, tri(p-methylbenzyl) silanol, and n-butyl diphenylsilanol.

The cocatalyst can be prepared in a solution or slurry. Typically hydrocarbon solutions or slurries of each reactant are combined at room temperature and atmospheric pressure. The reaction temperature and pressure is not considered critical. Generally any suitable temperature in the range of about 0° C. to about 50° C. can be used. Pressures generally in the range of about 0.1 psia to about 100 psia are suitable.

Generally it is preferred that the molar ratio of silanol to the aluminum compound reactant be no greater than 1/1 and that the molar ratio of silane diol to aluminum compound reactant be no greater than 0.5/1. Use of excess silicon compounds has been noted to have an adverse effect upon productivity when the catalyst is used in the polymerization of olefins. Typically the lower limit for the molar ratio of the silanol to the aluminum compound is about 0.2/1 and for silane diols about 0.1/1. A more preferred range for the silanol to aluminum compound molar ratio is about 0.4/1 to 0.6/1 and for the silane diols 0.2/1 to 0.4/1.

It is preferred to select a reaction medium that results in a solution of the silane-aluminum cocatalyst. Typical hydrocarbon suitable for use as reaction media include benzene, toluene, o-xylene and mixed xylenes as commerically sold.

The olefins for polymerization according to the present invention include those olefins known in the art to be polymerizable with catalysts of compounds of metals of Groups IVb, Vb, and VIb. Examples include, ethylene, propylene, 1-butene, 1-octene, 4-methylpentene-1, and the like.

The polymerization can be performed using the conditions that are conventionally used in olefin polymerizations using such catalyst. For example, it can be carried out in the presence or absence of an inert solvent such as heptane, hexane, or kerosene at temperatures in the range of about 0° C. to about 300° C., preferably about 20° C. to about 200° C., more preferably about 50° C. to about 180° C. and a pressure of 1 to about 70 kg/cm$^2$, preferably about 1 to about 50 kg/cm$^2$, more preferably about 2 to about 20 kg/cm$^2$. Typically the Group IVb–VIb catalyst is employed in an amount such that about 0.0001 to 1 millimole, based on the metal present per liter of solvent (or per liter of space in the polymerization zone in the absence of solvent). And the silicon-aluminum cocatalyst is typically employed in such an amount that the molar ratio of the aluminum to the titanium is about 1/1 to about 1000/1, preferably about 1/1 to about 100/1.

A further understanding of the present invention and its advantages will be provided by the following examples:

EXAMPLE I

Catalyst Preparation

A magnesium chloride support was first prepared by drying commerically obtained MgCl$_2$ under N$_2$ at 400° C. then adding the MgCl$_2$ to a container of isopropyl alcohol. The amount of MgCl$_2$ added was about 3 grams per 100 mL of the alcohol. The container was sealed and then subjected to rolling for several days.

A 100 mL portion of the MgCl$_2$ slurry was combined with dried n-heptane to give a total volume of about 900 mL and heated at reflux for 1200 hours at 97° C. Then the mixture was cooled to 75° C. and 100 mL of TiCl$_4$ was added. This mixture was then heated at reflux for 1330 hours, then cooled to room temperature and diluted with n-heptane to one liter. The slurry was then washed with n-hexane until essentially no TiCl$_4$ was present in the wash liquid. The slurry was then diluted to 800 mL with n-hexane. Ten mL of the slurry was evaporated to reveal 0.068 gm of solid catalyst.

EXAMPLE II

A cocatalyst was prepared by dissolving 1.3 gm of triphenyl-silanol in 40.5 mL of toluene. That solution was then combined with 10 mL of a 15 weight percent solution of triethylaluminum in n-heptane. (The mole ratio of silanol to the aluminum compound was 0.47/1.)

Then 10.1 cc of the cocatalyst mixture was combined with 1.0 cc of the catalyst slurry of Example I in a 1 gallon autoclave containing 1.2 liters of isobutane. The charge order was cocatalyst, catalyst, and then isobutane. The reactor was charged with 80 psi of hydrogen and enough ethylene to give a pressure in the range of about 465 to about 470. The polymerization was carried out at about 80° C. for one-half hour. The yield of polymer was 291.8 which is equivalent to about 86 kg of polymer per gm of catalyst per hour.

The melt index of the polymer was 0.425. The high load melt index 15.3. The HLMI/MI ratio was 38.

EXAMPLE III

A cocatalyst was prepared as above by combining a solution of triphenylsilanol in toluene with a solution of TEA in n-heptane to give a solution containing a mole ratio of silanol to TEA of 0.67/1.

About 15.7 mL of the cocatalyst mixture was used with about 1.0 mL of the catalyst of Example I in an ethylene polymerization in a one gallon autoclave in 2 liters of isobutane. The polymerization was conducted at about 80° C. with 80 psi H$_2$ and a total pressure of about 480 psi. The yield was 88.4 gms of polymer having a melt index of 0.25 and a HLMI of 7.0.

EXAMPLE IV

A cocatalyst was prepared by dissolving 2.5 grams of triphenylsilanol in 88.7 mL of toluene. That solution was then mixed with 10 mL of a 10 weight percent solution of TEA in n-heptane. (The molar ratio of silanol to aluminum was about 1.3/1.)

About 20 mL of the cocatalyst solution was used with 1.0 cc of the catalyst of Example I under polymerization conditions substantially the same as Example II. After 30 minutes only a trace of polymer was noted.

EXAMPLE V

A cocatalyst was prepared combining a solution of triphenylsilanol in toluene with a 25 weight percent solution of di-isobutyl-aluminum hydride to result in a mole ratio of silanol to hydride of 0.5/1.

About 12.4 mL of the cocatalyst solution was employed with 1 mL of the catalyst slurry of Example I. The polymerization of ethylene was carried out at 80° C. for one hour to give 273.3 grams of polymer having a melt index of 0.3898 and a high load melt index of 13.7.

EXAMPLE VI

A cocatalyst was prepared by adding 1 gram of diphenylsilane diol to 62.4 milliliters of toluene and combining that with 10 milliters of a 15 weight percent solution of triethylaluminum in n-heptane.

About 12.4 mL of the cocatalyst solution was used with 1 mL of the catalyst of Example I for polymerizing ethylene under conditions substantially the same as in Example II. After 1 hour 417.2 gms of polymer was obtained having a melt index of 0.5376 and a high load melt index of 16.26.

What is claimed is:

1. A catalyst system for the polymerization of olefins comprising
   (1) an olefin polymerization catalyst comprising a compound containing a metal of Groups IVb, Vb, and VIb, and (2) a cocatalyst comprising at least one compound of the formula

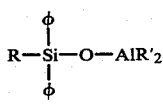

wherein each 100 is an arly radical, R is an aryl, or —O—AIR$_2$ and wherein each R' is individually selected from hydrogen, halides, alkyl, aryl, alkoxy, and aryloxy radicals, with the further requirement that if one of the R' radicals attached to an Al atom is a halide, the other must be a radical other than hydrogen and that only one of the R' radicals attached to each Al atom can be hydrogen.

2. A catalyst system according to claim 1 wherein the catalyst (1) comprises a compound of titanium or vanadium.

3. A catalyst system according to claim 1 wherein the catalyst (1) comprises titanium tetrachloride supported on magnesium dichloride.

4. A catalyst system according to claim 3 wherein each R' is an alkyl radical having 1 to 4 carbon atoms.

5. A catalyst system according to claim 4 wherein each R' is an ethyl radical and each aryl radical is a phenyl radical.

6. A catalyst system for the polymerization of olefins comprising
   (1) an olefin polymerization catalyst comprising a compound containing a metal of Groups IVb, Vb, and VIb, and
   (2) a cocatalyst prepared by reacting a silicon compound of the formula

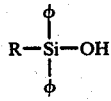

wherein each $\phi$ is an aryl radical, R is an aryl, alkyl, cycloalkyl, aralkyl, alkaryl, or hydroxyl radical with an aluminum compound of the formula AlR'$_3$ wherein each R' is individually selected from hydrogen, halides, alkyl, aryl, alkoxy, and aryloxy radicals with the further requirements that if one R' is a halide the other R' radicals must be selected from radicals other than hydrogen and that only one R' can be hydrogen.

7. A catalyst system according to claim 6 wherein the catalyst (1) comprises a compound of titanium or vanadium.

8. A catalyst system according to claim 7 wherein the catalyst (1) comprises titanium tetrachloride supported on magnesium dichloride.

9. A catalyst system according to claim 8 wherein each R' is an alkyl radical having 1 to 4 carbon atoms.

10. A catalyst system according to claim 9 wherein the cocatalyst is prepared by reacting triethylaluminum and triphenylsilanol.

11. A catalyst system according to claim 10 wherein about 0.2 to about 1 mole of triphenylsilanol is employed per mole of triethylaluminum.

12. A catalyst system according to claim 8 wherein said cocatalyst is prepared by reacting triethylaluminum and diphenylsilane diol.

13. A catalyst system according to claim 8 wherein said cocatalyst is prepared by reacting diisobutylaluminum hydride and triphenylsilanol.

14. A composition of matter having the formula

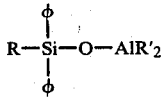

wherein each $\phi$ is a phenyl radical, R is a phenyl radical, and wherein each R' is individually selected from hydrogen, halides, alkyl, aryl, alkoxy, and aryloxy radicals, with the further requirement that if one of the R' radicals attached to Al is a halide, the other must be a radical other than hydrogen and that only one of the R' radicals attached to each Al atom can be hydrogen.

15. A composition according to claim 14 wherein R is a phenyl radical, each $\phi$ is a phenyl radical and each R' is an ethyl radical.

* * * * *

UNITED STATES PATENT AND TRADEMARK OFFICE
CERTIFICATE OF CORRECTION

PATENT NO. : 4,472,519

DATED : September 18, 1984

INVENTOR(S) : Max P. McDaniel

It is certified that error appears in the above-identified patent and that said Letters Patent is hereby corrected as shown below:

Column 5, line 9, "100" should read --- $\emptyset$ ---; line 10, "-O-AIR$_2$" should read --- -O-AlR'$_2$ ---; line 41, after "aryl", second occurrence, delete the comma (,): line 42, delete "alkyl, cycloalkyl, aralkyl, alkaryl".

Signed and Sealed this

Sixteenth Day of April 1985

[SEAL]

*Attest:*

DONALD J. QUIGG

*Attesting Officer*     *Acting Commissioner of Patents and Trademarks*